(12) United States Patent
Brown

(10) Patent No.: US 6,304,221 B1
(45) Date of Patent: *Oct. 16, 2001

(54) PROTECTIVE ANTENNA GUARD FOR CELLULAR TELEPHONES

(76) Inventor: Peter G. Brown, 236 Charles St., Waltham, MA (US) 02154

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/934,880

(22) Filed: Sep. 22, 1997

(51) Int. Cl.[7] .................................................. A45F 5/00
(52) U.S. Cl. .......................................... 343/702; 224/197
(58) Field of Search ........................ 224/197, 150, 224/118, 206, 382, 262, 242; 343/702, 872, 873, 841; 455/40, 351; 361/679

(56) References Cited

U.S. PATENT DOCUMENTS 5,383,091 * 1/1995 Snell ..................................... 361/679
5,528,770 * 6/1996 Castilla et al. ........................ 455/351
5,833,100 * 11/1998 Kim ....................................... 224/197

* cited by examiner

*Primary Examiner*—Don Wong
*Assistant Examiner*—James Clinger
(74) *Attorney, Agent, or Firm*—Mark P. White

(57) ABSTRACT

A protective antenna guard is intended for use with portable cellular telephones of the type with a retractable antenna, and further intended to be attached to the user's belt or clothing, being provided with clips for that purpose. The antenna guard provides support for the antenna in the retracted position, and also provides a smooth surface at the upper part of the phone, so that the phone, with the protective antenna guard attached, will not snag or become entangled in the user's clothing. The antenna guard is formed into two side tabs, a raised antenna support, a back, and sides, the whole guard being molded in one piece from a compliant, light-weight plastic or the like.

13 Claims, 2 Drawing Sheets

PROTECTIVE ANTENNA GUARD FOR CELLULAR TELEPHONES

BACKGROUND OF THE INVENTION

1. Field of the Invention

The present invention relates to antenna protectors for portable electronic devices and more particularly pertains to an antenna protection device for cellular phones which may be used to protect an antenna from physical harm when the phone is worn by attaching to the belt or clothing of a user.

2. Description Relative to the Prior Art

Mobile telephones, and most especially cellular telephones, are well known. Among the most common types of cellular telephones are those which are intended to be carried by attaching them onto the belt of the wearer. Such cellular telephones are generally provided with clips for this purpose.

Such personal portable cellular phones are also generally designed with retractable antennae which can be extended to a height of several inches when in use. These antennae are often rather fragile while in the fully extended position, but less so when retracted into the body of the phone. Even in the fully retracted position these antennae nevertheless usually extend up to an inch above the body of the telephone, so that the user can grasp the end of the antenna in order to extend it.

It has been seen that the retracted antenna end is still vulnerable to damage. When worn on the belt of the user, as seen in FIG. 1, the antenna end is may become entangled in the user's clothing. The user may not even be aware of such entanglement. As a result the antenna end may be broken off, bent, or otherwise damaged before the wearer is cognizant that there is a problem of this nature.

The present invention solves the problem of damaged antennae by providing a simple, low cost antenna guard which supports the antenna end in the fully retracted position, and further provides a streamlined, non-obtrusive upper surface to the phone, making it less likely to snag or become entangled with the user's clothing.

For these reasons, the current invention presents a significant improvement over the design of the cellular phone, without such an antenna guard as seen in prior art.

SUMMARY OF THE INVENTION

A general object of the present invention is to provide an antenna guard for cellular phones of the type having retractable antennae, and of the type intended to be attached to the clothing of the user. The antenna guard protects the antenna from physical harm to the antenna in the retracted position, and further prevents the antenna from snagging in the wearer's clothing, and from becoming entangled therein.

According to one aspect of the invention, the antenna guard comprises a guard body affixable to the cellular phone, a raised antenna support integrally formed from the guard body, and means for securing the guard body to the phone.

According to another aspect of the invention, the means for securing the guard body to the cellular phone comprises a pair of opposing side tabs integrally formed from the guard body.

According to still another aspect of the invention, the raised antenna support totally envelops the antenna by means of an aperture through the raised antenna support, allowing the user to extend and retract the antenna from the cellular phone.

According to yet another aspect of the invention, the guard body further comprises an integrally-formed back cover, so that the antenna guard as a whole forms an integrated structure.

According to yet another aspect of the invention, the guard body further comprises an integrally-formed top cover joining the far side tab and the raised antenna support, so that when the guard is affixed to the cellular phone a smooth, integrated structure without sharp edges or projections is provided.

According to a final aspect of the invention, the antenna guard is molded in one piece from a light-weight, compliant plastic material having a memory, so that the antenna guard will be able to clip onto the phone and remain firmly attached thereto.

DETAILED DESCRIPTION OF THE PREFERRED EMBODIMENT

Figure 1:
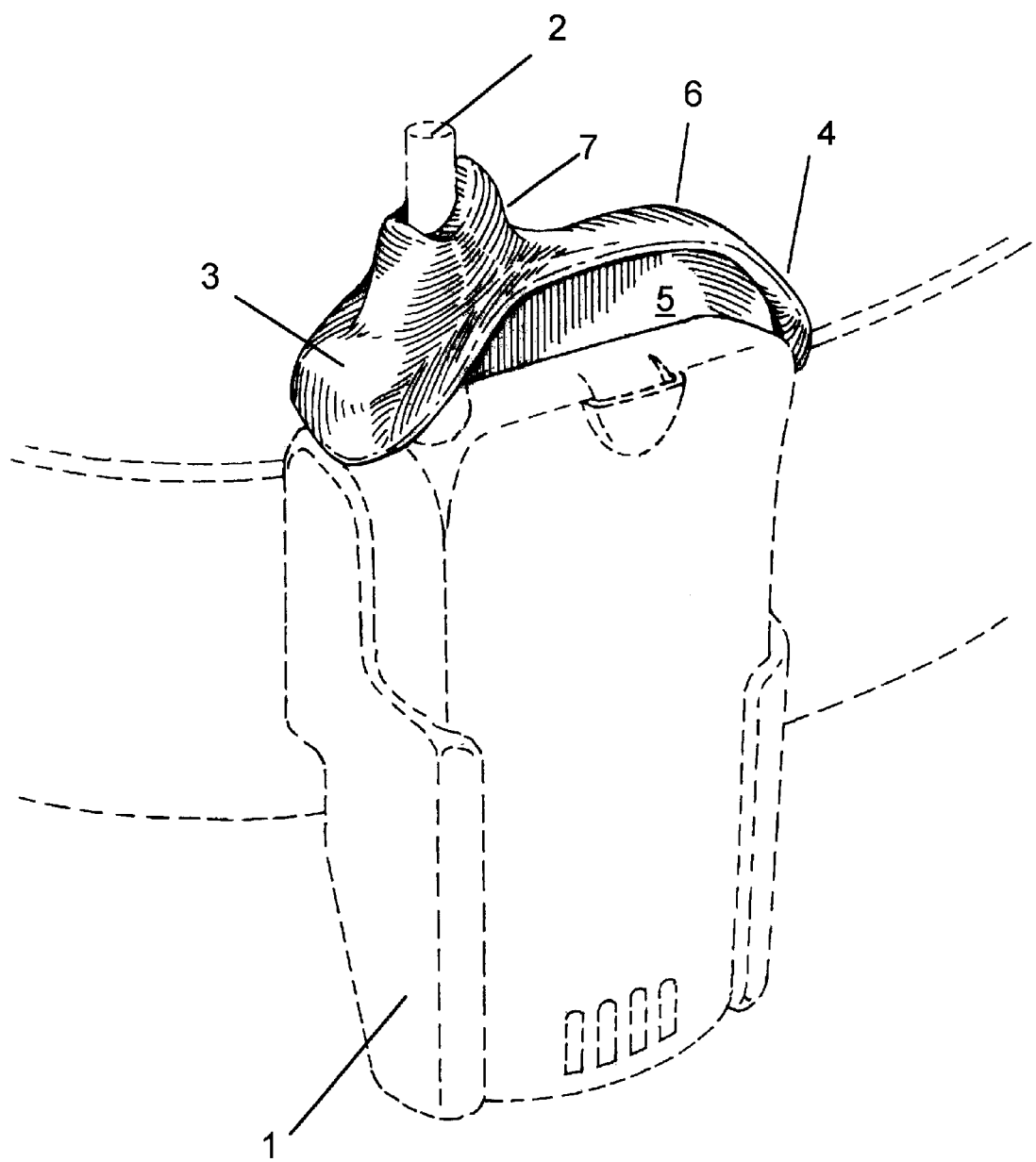
FIG. 1 is a perspective view of the Protective Antenna Guard, showing the guard as attached to the belt of the wearer.

The preferred embodiments may be understood by first referring to FIG. 1, which depicts the invention as viewed from the front, that is when the antenna guard is attached to the wearer's belt, and when viewed facing the wearer. In the preferred embodiment the antenna guard is designed to clip atop a phone of the StarTAC® type (StarTAC is a Registered Trademark of Motorola, Inc.) but the design is equally applicable to a number of other models manufactured by other manufacturers.

The antenna guard clips onto the top of the phone 1 as seen in FIG. 1. Referring to FIG. 1, it is seen that the antenna end, 2 extends through the top of the antenna guard, so that the antenna is still accessible to be grasped by the user in order to extend it during a telephone call using the cellular phone.

The antenna guard is injection molded in one piece from plastic, or other compliant, light-weight material. The nature of the material is such that the guard can be repeatedly attached and removed from the telephone without breaking the antenna guard, and without scratching or otherwise damaging the surface of the phone. Thus the material must have a "memory", such that it always returns to its original dimensions, despite being flexed during attachment to the phone.

Figures 2, 3:
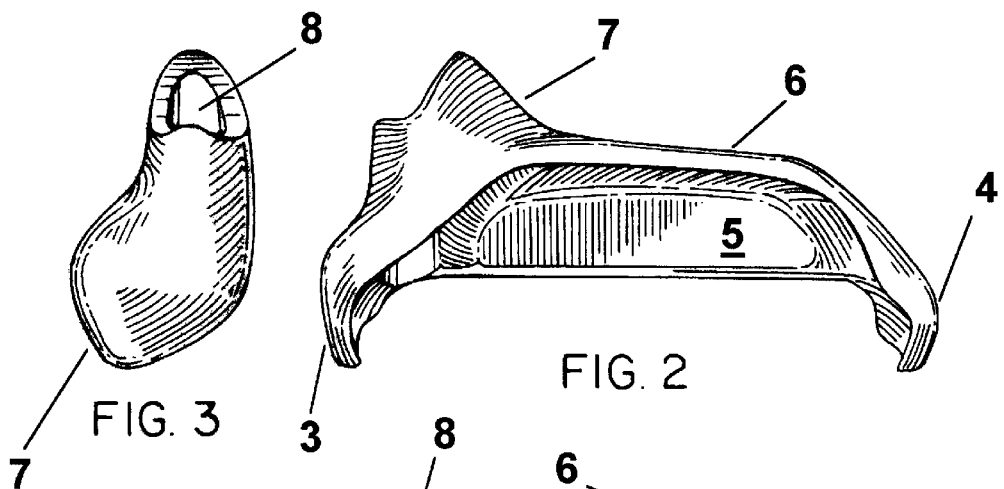
FIG. 2 is a front view, as seen when looking at the wearer.
FIG. 3 is a left side view.
Figure 4:
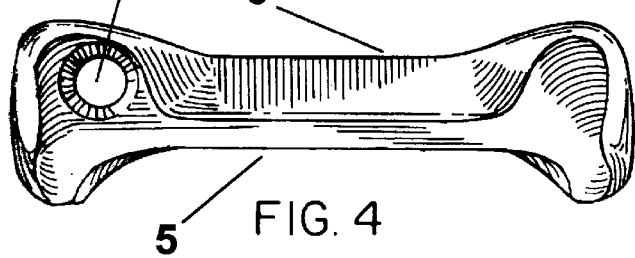
FIG. 4 is a bottom view.
Figure 5:
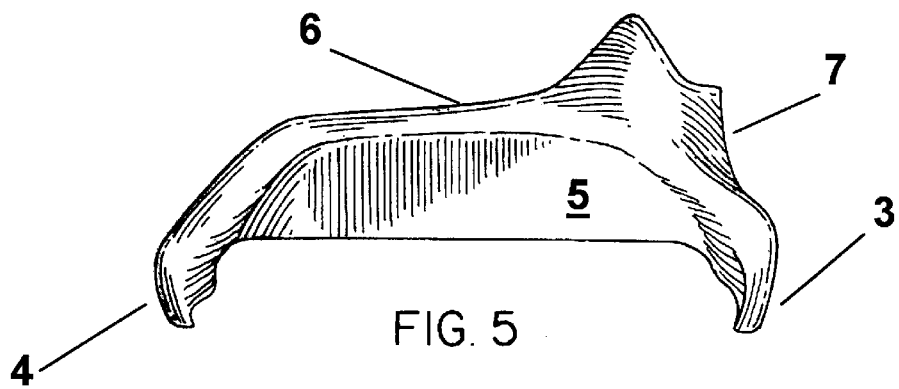
FIG. 5 is a rear view.

Also as seen in FIGS. 1, 2, and 5, the antenna guard is attached to the phone by means of two side tabs 3 and 4 which may be extended relative to each other in order to attach to the phone, but which will then attempt to return to their original dimension so that a slight pressure is created thereby, gripping the phone securely while attached. The side tab 3 nearest the antenna support 7 is designated the near tab, and the other tab 4 is designated the far tab.

The guard further comprises a raised antenna support 7, which is smoothly integrated into the antenna guard, and which contains an aperture 8 from which the antenna end 2 protrudes. The antenna support 7 envelops most of the exposed end of the antenna 2 in the fully retracted position, making the antenna much less subject to breaking. Furthermore, it is seen from FIG. 1 that the antenna end when retracted into the antenna support, produces and overall effect without sharp edges, angles, projections, or changes in direction. Nevertheless, the antenna may still be easily extended or retracted while the antenna guard is in place.

The antenna guard further comprises a top cover 6 which is smoothly integrated into the antenna guard, and which provides a smooth egress from the raised antenna support to the far tab 4.

The antenna guard finally comprises a back cover 5, which is smoothly integrated into the antenna guard, and which further smoothes the overall configuration of the antenna guard, lessening the possibility of snagging the guard on the wearer's clothes.

While the invention has been described with reference to specific embodiments, it will be apparent that improvements and modifications may be made within the purview of the invention without departing from the scope of the invention defined in the appended claims.

What is claimed as being new and desired to be protected by Letters Patent of the United States is as follows:

1. An antenna guard for a cellular phone of the type having a retractable antenna, comprising:
    a guard body;
    a substantially cylindrical, raised antenna support, entirely enclosing the antenna over its retracted height, said raised antenna support molded together with the guard body, and forming a smooth transition from said guard body; and
    opposing tabs, molded from the guard body, said tabs extending downward over the top of the cellular phone, engaging the sides of the phone at its topmost location when the antenna guard is affixed to the phone,
    the entire antenna guard being made of a compliant, homogeneous material, so that the antenna guard protects the antenna from physical harm, and prevents snagging on the user's clothing.

2. The antenna guard of claim 1, wherein the antenna has a base, and wherein said raised antenna support is formed about said base.

3. The antenna guard of claim 2, wherein said antenna and said raised antenna support have long axes parallel to each other.

4. The antenna guard of claim 3, wherein said raised antenna support is of sufficient dimension to lend structural support to said antenna.

5. The antenna guard of claim 4, wherein the raised antenna support contains an opening which allows the antenna to be extended without moving said support.

6. The antenna of claim 5, wherein the guard body further comprises a back cover molded from the guard body, said back cover and said opposing tabs smoothly joining to provide an integrated structure.

7. The antenna guard of claim 6, wherein the guard body further comprises a top cover molded from the guard body, said top cover joining the opposing tabs and the raised antenna support, so that when the guard is affix to the cellular phone a smooth, integrated structure without sharp edges or projections is provided.

8. An antenna guard for a cellular phone of the type having a non-retractable antenna, comprising:
    a guard body;
    a substantially cylindrical raised antenna support, entirely enclosing the antenna, said raised antenna support molded together with the guard body, and forming a smooth transition from said guard body; and
    opposing tabs, molded from the guard body, said tabs extending downward over the top of the cellular phone, engaging the sides of the phone at its topmost location when the antenna guard is affixed to the phone,
    the entire antenna guard being made of a compliant, homogeneous material, so that the antenna guard protects the antenna from physical harm, and prevents snagging on the user's clothing.

9. The antenna guard of claim 8, wherein the antenna has a base, and wherein said raised antenna support is formed about said base.

10. The antenna guard of claim 9, wherein said antenna and said raised antenna support have long axes parallel to each other.

11. The antenna guard of claim 10, wherein said raised antenna support is of sufficient dimension to lend structural support to said antenna.

12. The antenna of claim 11, wherein the guard body further comprises a back cover molded from the guard body, said back cover and said opposing tabs smoothly joining to provide an integrated structure.

13. The antenna of claim 11, wherein the guard body further comprises a top cover molded from the guard body, said top cover joining the opposing tabs and the raised antenna support, so that when the guard is affixed to the cellular phone a smooth, integrated structure without sharp edges or projections is provided.

* * * * *